United States Patent [19]

Bucholtz

[11] 3,785,034

[45] Jan. 15, 1974

[54] WIRE LEAD CUTTER FOR ARMATURE WINDING MACHINE
[75] Inventor: Glen E. Bucholtz, Tipp City, Ohio
[73] Assignee: The Globe Tool and Engineering Company, Dayton, Ohio
[22] Filed: Sept. 7, 1972
[21] Appl. No.: 286,954

[52] U.S. Cl............. 29/205 C, 29/205 CM, 29/597, 29/598, 242/7.05 B
[51] Int. Cl. ......................................... H02k 15/00
[58] Field of Search ..................29/598, 242/7.05 B 29/205 CM, 596, 597, 598, 605; 310/234; 242/705 A, 705 B, 705 C, 705 R

[56] References Cited
UNITED STATES PATENTS
3,713,209  1/1973  Biddison ............................. 29/597
3,585,716  6/1971  Steinke ............................... 29/597

Primary Examiner—Charles W. Lanham
Assistant Examiner—Carl E. Hall
Attorney—Dybvig & Dybvig

[57] ABSTRACT

Cutters are mounted for movement within the assembly of commutator shields used in a double flier armature winding machine. The cutters are drivingly connected to a moving shield.

4 Claims, 5 Drawing Figures

PATENTED JAN 15 1974 3,785,034
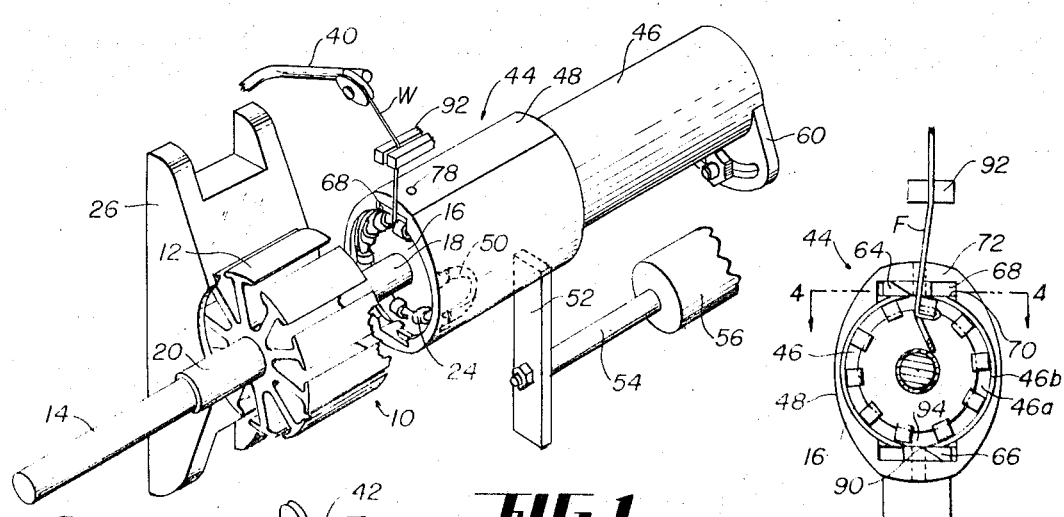
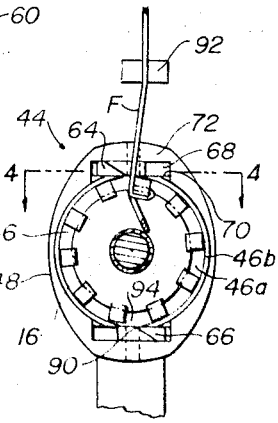
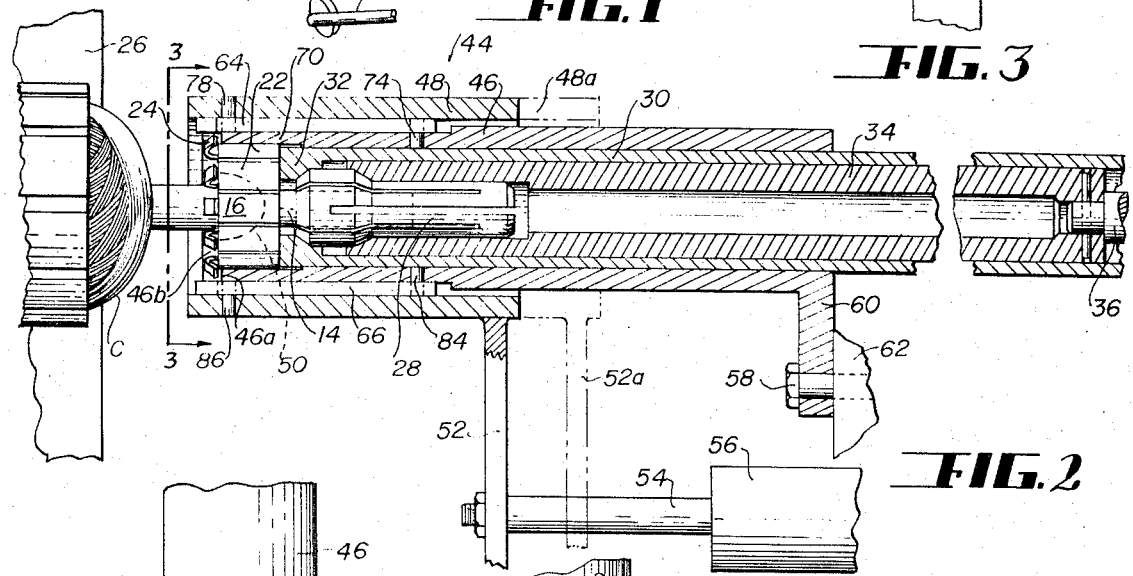
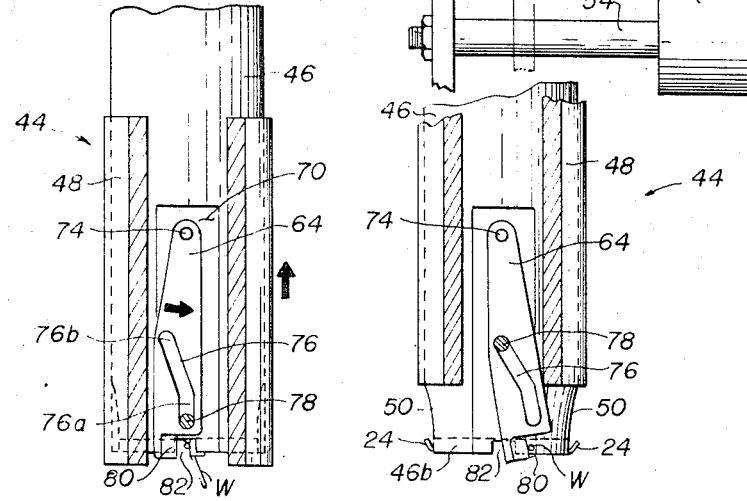

WIRE LEAD CUTTER FOR ARMATURE WINDING MACHINE

BACKGROUND OF THE INVENTION

Field of the Invention

This invention relates to a wire lead cutter for armature winding machines and more particularly to a cutter for use in a flier type armature winding machine for cutting lead wires immediately adjacent commutator hooks or tangs.

Those versed in the art are familiar with the operation of a double flier armature winding machine. An empty armature core is located between a pair of wire guides while a pair of wire guiding fliers which rotate about axes perpendicular to the armature shaft simultaneously wind coils in pairs of armature core slots. When winding armatures provided with commutators having lead receiving hooks or tangs, it is now common practice for the wire leads between coils to be coursed or looped about the hooks or tangs during the automatic operation of the machine. While the fliers are rotating to wind coils, the stretch of wire between each flier and the armature core is prevented from accidentally engaging a commutator hook by a shield assembly which typically involves an inner shield and an outer shield. The outer shield is moved at the end of the winding of each coil or pair of coils in order to expose a pair of tangs. U.S. Pat. No. 3,506,864 discloses such a shield assembly and a method of connection of the wire leads between coils to the tangs.

The wires which are called "start wires" leading to the first coils wound and also the wires called "finish wires" leading from the last coils wound in an armature require treatment different from the wire leads between the wound coils. In the past the start and finish wires were commonly connected to the tangs by hand.

Prior Art

U.S. Pat. Nos. 3,585,716 and 3,628,229 disclose methods for avoiding hand operations and also the lengths of wasted wire resulting from prior winding practice.

In the application for Letters Patent of the United States of John M. Biddison titled Automatic Armature Winding, Ser. No. 97,488, filed Dec. 14, 1970, a fully automatic method and apparatus is disclosed for cutting the start and finish wires immediately adjacent the commutator tangs to which these wires are connected while the armature is still located at the winding station. In the aforementioned Biddison application, the stretch of wire leading from the last coil wound to a flier is engaged by a clamp and then cut. The wire is gripped by the clamp while the wound armature is removed and an unwound armature inserted in its place. The start wire for the unwound armature is looped about a commutator tang and the winding of a coil begun, at which time the wire is again cut and the clamp removed from the winding area.

The application for U.S. Letters Patent of James N. Doyle, Ser. No. 177,618, titled Armature Winding Method, filed Sept. 3, 1971, discloses an improved method for attaching the start wires to the commutator hooks or tangs which enables the cutting of the wire free from the clamp before the winding commences. Other apparatus has been developed for the purpose of cutting lead wires closely adjacent the commutator hooks or tangs.

SUMMARY OF THE INVENTION

This invention provides a simple cutter mechanism which advantageously requires minimal space in the otherwise congested area of a commutator of an armature being wound. The cutter mechanism is located in the commutator shield assembly and is drivingly connected to the outer shield. Since the outer shield is necessarily moved in order to expose the tangs for receiving the start and finish wires, a drive mechanism must always be provided for the outer shield. In accordance with the present invention, the same drive mechanism is used to power the cutter mechanism.

In the preferred embodiment illustrated herein, the cutter mechanism consists of a pair of cutter blades, one for each flier. Each cutter blade is located in a pocket formed between the inner and outer shields and is pivoted to the inner shield. A pin and slot drive mechanism connects the outer shield to each cutter blade for controlling the position of the blade. Depending upon the nature of the wire used in winding the armature, each wire may be cut while backed up by a commutator tang or backed up by an inner shield notch.

BRIEF DESCRIPTION OF THE DRAWING

FIG. 1 is a perspective view of a portion of an armature winding machine with an unwound armature in position to be wound.

FIG. 2 is a side elevational view with parts in longitudinal cross section of a portion of the apparatus of FIG. 1 and showing additional details thereof. In FIG. 2 the armature is shown provided with coils of wire but, to avoid a profusion of lines, the wire leads between coils are not illustrated.

FIG. 3 is an end elevational view of the apparatus shown in FIG. 2 and taken in the direction of arrows 3—3 thereof. In FIG. 3 a finish wire is shown looped about a commutator hook or tang. Again, to avoid a profusion of lines, the wire lead connections to the other commutator tangs are not shown.

FIG. 4 is a sectional view of a portion of the apparatus shown in FIGS. 1, 2 and 3 and taken along section line 4—4 of FIG. 3.

FIG. 5 is a view similar to FIG. 4 but showing the parts during a different interval of the operation thereof.

DESCRIPTION OF THE PREFERRED EMBODIMENT

In FIG. 1 an unwound armature, generally designated 10, is shown at the winding station of a double flier armature winding machine. The armature 10, as conventional, includes a slotted core 12 mounted on a shaft 14 upon which a commutator 16 is also mounted. There is an insulating sleeve 18 surrounding the shaft between the core 12 and the commutator 16 and another insulating sleeve 20 projecting from the end of the core 12 opposite the commutator 16. The commutator 16 is of the type having a plurality of peripherally spaced segments 22 (FIG. 2) with hooks or tangs 24 at the ends thereof adjacent the core 12.

The armature 10 is located between a pair of wire guide wings, only one of which, designated 26, is illustrated in the drawing, the armature being supported partly by confronting concavely curved surfaces of the guide wings and partly by a chuck assembly including a split collet sleeve 28 gripping the end of the armature shaft 14 adjacent the commutator 16. The collet sleeve 28 is located within a collet retainer 30 and is urged toward the end wall, designated 32, thereof by a collet actuator 34 driven by a collet operator shaft 36. The armature shaft 14 is gripped and released by axial movement of the operator shaft 36 which in turn is driven by a suitable fluid motor. This type of collet mechanism is disclosed, for example, in FIG. 4 of U.S. Pat. No. 3,673,878.

Coils of wire such as those designated C in FIG. 2 are wound two at a time into spaced pairs of slots in the core 12 by a pair of fliers 40 and 42. Since the manner of operation of flier type winders is well known, it is not described in detail herein. Suffice to state that the fliers are rotated to wind coils, the wires such as that designated W leading from the fliers being guided into the core slots by the guide wings. After a pair of coils are wound in this manner, the rotation of the fliers is temporarily discontinued and the stretches of wires leading to the fliers are coursed over or looped about a pair of tangs 24 to form lead wires. During this interval the fliers may be reversely rotated such as disclosed in the aforementioned U.S. Pat. No. 3,506,864. After the lead wires are looped about the tangs, the armature is positioned so as to receive a second pair of coils in adjacent slots. The particular collet structure discussed above is useful for practice of the process disclosed in the aforementioned U.S. Pat. No. 3,506,864 in which the armature is rotated through an angle on the order of 360° during the intervals in which lead wire connections to the commutator are made. The particular angle through which the armature is thus rotated will determine which of the pairs of slots are positioned for receiving the next pair of coils to be wound.

During the winding of coils, that is, while the fliers 40 and 42 are rotating, the commutator tangs 24 are shielded to prevent the stretches of wires leading to the fliers from hooking or catching on the tangs. For this purpose a shield assembly generally designated 44 is provided consisting of a tubular inner shield 46 and a concentric tubular outer shield 48. The forward end of the inner shield 46 confronting the armature 12 has a relatively deep central bore for receiving the commutator 16, a smaller bore terminating in a shoulder 46a confronting the ends of the tangs 24, and a rim 46b overlying the tangs. Diametrically opposed notches 50 extend rearwardly from the forward face of the inner shield 46 in order to expose a pair of tangs 24. The outer shield 48 is mounted by a bracket 52 to the piston 54 of a linear fluid actuator 56. While the fliers are rotating to wind coils, the outer shield 48 occupies the position illustrated in full lines in FIG. 2 wherein it will be noted that the end of the outer shield 48 closest to the armature core 12 encircles the commutator tangs 24. When thereafter, the fliers stop rotating, the fluid actuator 56 is energized to move the outer shield 48 away from the core 12 as suggested by phantom lines 48a and 52a in FIG. 2. Upon retraction of the outer shield 48, lead wires can be looped around the pair of tangs 24 exposed by the inner shield notches 50. After the wires are then looped about the tangs, the fluid actuator 56 is energized to move the outer shield back to the full line position thereof shown in FIG. 2 so that the winding of another pair of coils can commence. The location of the notches 50 is dependent upon the rotary orientation of the inner shield 46 which, in turn, may be preadjusted by appropriately aligning an arcuately slotted adjustment plate 60 with a fixed machine part designated 62 in FIG. 2 and then clamping the plate 60 thereto by a bolt 58. The construction and operation of parts as thus far described may be essentially identical to corresponding parts illustrated in the aforementioned U.S. Pat. Nos. 3,506,864 and 3,673,878.

In accordance with this invention the shield assembly 44 is provided with a cutter mechanism drivingly connected to the outer shield. In the specific embodiment illustrated, the cutter mechanism includes a first elongate cutter blade 64 which cooperates with the left hand flier 40 and a second elongate cutter blade 66 (FIGS. 2 and 3) which cooperates with the right hand flier 42. The first cutter blade 64 is housed in a pocket 68 bounded by a flat 70 formed on the upper surface of the inner shield 46 and a confronting flat surface 72 of the outer shield 48 which is at the base of a notch therein. With particular reference to FIGS. 2, 4 and 5, the blade 64 is pivotally mounted by a pivot pin 74 to the inner shield 46 for movement about a vertical axis extending perpendicularly through the axis of the mounting of the armature shaft 14. The cutter blade 64 has a cam slot 76 extending along its length in which a drive pin 78 affixed to the outer shield 48 is trapped. The end of the cutter blade 64 closest adjacent to the core 12 is provided with a cutting edge 80 adapted to sweep across a notch 82 in the front face of the inner shield rim 46b.

FIG. 4 illustrates the position of the blade 64 and the outer shield 48 during an interval in which coils are being wound by the fliers. FIG. 5 shows the position of the same parts during the interval in which the outer shield 48 is retracted away from the armature core 12 to expose a pair of tangs 24. Because the drive pin 78 is trapped in the cam slot 76, the movement of the outer shield 48 away from the armature core 12 causes the blade 64 to be pivoted about the axis of the pin 74 to the right, that is, in the direction of the arrow thereon shown in FIG. 4, whereupon the cutting edge 80 moves vertically across the top of the notch 82. When the outer shield 48 is subsequently extended back into covering relation to the tangs 24, the blade 64 will move in the opposite direction to the position illustrated in FIG. 4.

The lower cutter blade 66 is a mirror image of the upper cutter blade 64. As shown in FIG. 2 it is connected by a pivot pin 84 to the inner shield 46 and driven by a drive pin 86 trapped in a cam slot therein. As shown in FIG. 3 the lower cutter blade 66 has a cutting edge 90 and its operation is the same as the operation of the upper cutter blade 64 except it travels in the opposite direction thereto.

From the foregoing it is apparent that the cutter blades 64 and 66 will each undergo a pivotal movement first in one direction when the outer shield 48 is retracted and then in the opposite direction when the outer shield 48 is extended. During the winding of an armature, that is, after the start wires have been cut away, the pivotal movement of the cutter blades 64 and 66 have no effect upon the operation of the machine. This is because the stretches of wire leading from the armature or the commutator to the fliers are invariably located remotely from the cutter blades.

At the end of the winding of the last coil by each flier, the finish wires are looped about the appropriate commutator tangs. Such a finish wire is designated F in FIG.

3. The finish wires may be looped about tangs at the "3 o'clock" and the "9 o'clock" positions. That is, the tangs may be located at approximately the horizontal midline of the armature. After the finish wires are looped about appropriate tangs, the armature is rotated to bring these tangs closer to the vertical, i.e., the "12 o'clock" and the "6 o'clock" positions. In addition, the stretches of wires between the tangs about which the finish wires are looped and the fliers are engaged by clamps such as the clamp schematically illustrated at reference character 92. The clamp 92 can be used to pull the wire W leading from the left hand flier 40 into the upper notch 82 upon the initial movement of the outer shield 48 away from the armature core 12. At the same time the corresponding clamp (not shown) for the associated lower cutter blade 66 would move the wire leading from the flier 42 into a diametrically opposed notch 94 over which the lower blade 66 sweeps.

Again with reference to FIG. 4 it will be noted that the cam slot 76 has a first portion 76a, the longitudinal axis of which is essentially parallel to the longitudinal axis of the shields 46 and 48, and a second portion 76b which is at an acute angle to the aforementioned axis. Accordingly, during the initial movement of the outer shield 48 away from the armature core 12, the blade 64 undergoes little or no pivotal movement until such time as the drive pin 78 enters into the slot portion 76b. Therefore, the wire W in FIG. 4 will assuredly enter the notch 82, since pulled therein by the clamp 92, before the blade 64 is pivoted. The same will be true of the wire to be cut by the lower blade 66. The wire clamp 92 and the corresponding clamp (not shown) which cooperates with the flier 42 may be of any suitable design. As will be apparent to those skilled in the art, simple drives can be provided for the clamps which will move them into clamping engagement with the wires and then move them away from the armature core 12 to locate the wires within the notches 82 and 94. The latter movement, of course, is simultaneous with the initial retraction movement of the outer shield 48. As an obvious alternative, the outer shield could be retracted in two discreet increments, first to uncover the notches 82 and 94 and then to pivot the cutter blades 64 and 66. In such event the wire clamps could be moved to extend the wires into the notches 82 and 94 immediately after the initial retraction movement of the outer shield 48. In any event, entirely conventional machine controls (not shown) are employed to achieve the proper sequence of machine operations.

During the pivotal movement of the blade 64, the stretches of wire between the tangs to which the finish wires are looped and the fliers will bear against these tangs and the blades 64 and 66 will sweep closely adjacent them causing the wires to be severed. As a result, the cut ends of the wires may be further twisted about the tangs. Alternatively, in case the wire to be cut is heavier than the tangs can withstand, the collet 28 may be released from gripping engagement with the armature shaft 14. During the subsequent cutting movements of the blades 64 and 66, the armature will be rotated thereby through a small angle until the aforementioned stretches of wire engage against the sides of the notches 82 and 94. At such time the continued pivotal movement of the blades 64 and 66 will cause the wires to be cut.

The same cutting operation described above is used when cutting away the start wires. After the finish wires have been cut away, the wound armature will be removed from the winding station and replaced by an unwound armature. During this interval the wires leading to the fliers remain clamped. After the wire stretches between the fliers and the clamps are appropriately connected to a pair of tangs, the outer shield 48 is retracted and the stretches of wires between the clamps and the tangs are located in the notches 82 and 94. These stretches of wires are then severed by the pivotal movement of the blades 64 and 66 as the outer shield 48 continues to be retracted.

Although the presently preferred embodiment of this invention has been described, it will be understood that within the purview of this invention various changes may be made within the scope of the appended claims.

Having thus described my invention, I claim:

1. In an armature winding machine of the type having a flier for winding coils and a commutator tang shield construction including an inner shield with a notch for exposing a tang, an outer shield surrounding the inner shield and shield drive means for moving said shields relative to one another, the improvement of means for cutting the wire lead to the first and from the last coil wound by said flier in an armature, said means including a cutter blade mounted for movement upon one of said inner shield and said outer shield, and blade drive means connected to the other of said shields and engaging said blade for moving said blade upon actuation of said shield drive means.

2. The improvement of claim 1 wherein said blade is provided with a cam slot and said blade drive means includes a pin trapped in said slot and connected to said other of said shields.

3. The improvement of claim 1 wherein said blade is movable in a pocket partly formed by confronting surface of said shields, the end of said blade remote from the commutator being mounted by pivot means upon said inner shield, and said blade drive means including a drive member connected to said outer shield and pivoting said blade about the pivot axis of said pivot means.

4. The apparatus of claim 1 wherein said inner shield is notched to receive a wire lead and said blade has a cutting edge which sweeps across said notch upon movement of said blade.

\* \* \* \* \*